April 30, 1968 G. FRANZEN 3,380,240
DOUBLE TWISTING MACHINE
Filed Oct. 14, 1965 9 Sheets-Sheet 1

FIG.1

INVENTOR
Gustav Franzen
BY

FIG.2

April 30, 1968  G. FRANZEN  3,380,240
DOUBLE TWISTING MACHINE

Filed Oct. 14, 1965  9 Sheets-Sheet 3

INVENTOR
Gustav Franzen
By
Walter Becker

April 30, 1968 G. FRANZEN 3,380,240

DOUBLE TWISTING MACHINE

Filed Oct. 14, 1965 9 Sheets-Sheet 9

INVENTOR
Gustav Franzen
By

# United States Patent Office 3,380,240
Patented Apr. 30, 1968

3,380,240
DOUBLE TWISTING MACHINE
Gustav Franzen, Neersen, near Krefeld, Germany, assignor to Palitex Project-Company, GmbH, Krefeld, Germany
Filed Oct. 14, 1965, Ser. No. 495,815
Claims priority, application Germany, Oct. 14, 1964, P 35,269
20 Claims. (Cl. 57—58.83)

ABSTRACT OF THE DISCLOSURE

The present invention relates to a textile machine unit for use in connection with a two-for-one twisting machine, which is characterized primarily by a block shaped housing having a top wall and a bottom wall with a balloon-confining wall section and a front wall with a threading slot, one of said walls being provided with means for detachably connecting said housing to a two-for-one twisting frame, while a spindle bearing casing is arranged substantially coaxially with regard to said balloon-confining wall section and in fixed connection therewith.

---

The present invention relates to a two-for-one or double twisting machine. Heeretofore known machines of this type with spindles on one or both sides of the machine in one or more rows primarily consist of a machine frame subdivided into a plurality of field sections, and end fields which latter house the transmissions and motor drives.

The individual spindles are journalled on or in spindle rails extending along the machine. Each spindle has associated therewith a spindle rotor supporting the resting yarn body protective basket with the hollow spindle shank and the yarn body, whereas the balloon confining means, thread guiding means, tension rollers and other parts pertaining to or cooperating with the respective spindle are connected to the spindle rail or other parts of the machine frame. All of these parts have to be centrically arranged in a certain way with regard to the respective spindle shank which fact causes frequently considerable difficulties during the assembly operations. In this connection it is to be borne in mind that over the considerable length of the machine, when determining the bearing and connecting areas for the parts cooperating with each other, tolerances may occur which endanger the precise cooperation of the individual parts. Thus, for instance, small tolerances of the connecting areas of the balloon confining means on the machine frame may bring about that the balloon confining means are not centrically arranged with regard to the spindle shank so that the thread balloon will not be worn uniformly on all sides. Moreover, it has also to be taken into consideration that tolerances occur by deformations within the machine frame and that these tolerances may also bring about the above mentioned drawback. Thus, as a rule, a thread guiding member which has to be connected to the machine frame in axial arrangement with the spindle may already deviate from this desired position.

Heretofore known machines of the above mentioned type have the additional drawback that installation operations on a spindle are frequently somewhat impeded by the closely adjacent spindles so that during such installation work also the adjacent spindles have to be stopped. This, however, means that when a single spindle is to be repaired, additional spindles have to be stopped.

The number of spindles to be stopped in such an instance is even greater with two-for-one twisting machines in which the balloon confining means are mounted in a box-shaped housing which covers up to the outside all balloon confining means of one side of a machine or a group of balloon confining means. Such a cover is described for instance in German Patent No. 1,171,783.

It is an object of the present invention to provide a two-for-one twisting machine with spindles on one or both sides, which may have the spindles arranged in one or more vertically spaced rows, which will overcome the above mentioned drawbacks without incurring other drawbacks.

It is another object of this invention to provide a two-for-one twisting machine, in which the thread discharge openings in the spindle rotor will easily be accessible from the outside.

It is still another object of this invention to provide a two-for-one twisting machine, which will permit a very precise axial arrangement of the bearing means and balloon confining means with regard to each other without the necessity of providing means for permitting a post-adjustment.

These and other objects and advantages of the invention will appear more clearly from the following specification in connection with the accompanying drawings, in which.

The two-for-one twisting machine according to the present invention is characterized primarily in that housing bodies having a width corresponding to the spindle spacing are located directly adjacent to each other and are detachably connected to a machine frame while each of said housing bodies has journalled therein a spindle and has connected thereto a balloon confining member, said housing bodies completely encasing the spindle and balloon confining member, at least on the operator's side, in such a way that the housing body of one machine side forms a spindle cover extending over the length of the machine.

According to the present invention, the housing body may be formed by a hollow block-shaped member which is open toward the machine frame and the front wall of which has, preferably at the lower end thereof, a widened threading slot while the bottom of said housing is designed as balloon confining bottom. Such a design of the housing body represents a further simplification inasmuch as block-shaped housing bodies can be arranged in direct contact with each other and adjacent to each other and in this position can easily be connected to the machine frame while they will laterally support each other. By the provision of a bottom for the balloon confining member, the latter will be closed in downward direction without requiring special bottom parts. In this way air will be prevented from passing through the balloon confining member in axial direction from the top to the bottom as is the case with balloon confining members which are open at the bottom. This air flow encountered with balloon confining members open at the bottom affects the shape of the thread balloon in a disadvantageous manner and on the other hand aids in the whirling around of dust and lint. The desired goal that the thread outlet openings in the spindle rotor should easily be accessible from the outside has been realized by the present invention inasmuch as the threading slot at the lower end may be broadened so that the spindle rotor or the inner chamber of the balloon confining member will be accessible through said broadened part, for instance with threading tools or other small tools.

In conformity with a further feature of the present invention, the spindle bearing housing may be centrically arranged in the balloon confining bottom whereby the spindle structure will be considerably simplified over a spindle with which the bearing section is provided in the spindle rail or is arranged on the spindle rail by means of bearing supports or the like.

According to a further development of the invention, the front wall of the housing may be extended downwardly beyond the balloon confining bottom and may be angled off inwardly in such a way that it will cover toward the front and toward the bottom the spindle portions which extend below the balloon confining bottom. In this way the spindle is covered relatively far downwardly, and this spindle cover will with the adjacent housing bodies form a partial machine cover extending over the entire length.

According to still another development of the present invention, the extension of the front wall may have means for receiving the actuating lever of a spindle brake so that also the brake may be combined with the housing body.

Instead of providing the balloon confining bottom for receiving the spindle bearings, it is also possible to provide a spindle bearing receiving means in the angled off portion of the front wall. Also in this instance the bearing and balloon confining member may be axially arranged with regard to each other in a precise manner without the necessity of providing means for post-adjusting the bearing and balloon confining member inasmuch as such post-adjustment will be superfluous.

It is a well known practice with spindles driven by a whorl by means of tangential belts to provide tensioning rollers between the spindle whorls in order to impart upon said belts the necessary tension and engagement with the whorls. With heretofore known machines, the tension roller supports are arranged on the machine frame and therefore have to be precisely adjusted with regard to the whorls. When arranging the tensioning rollers in conformity with the present invention, a considerable simplification is obtained inasmuch as a tensioning roller support may be provided on the balloon confining bottom or at the angled off portion of the front wall of the housing while the support for the tensioning roller may be connected so as to be adjustable perpendicularly with regard to the spindle axis. In this way the support for the tensioning roller will be incorporated in the spindle unit and the tensioning roller may be so arranged as to engage the belt between two whorls or may be associated directly with a whorl. As mentioned above, the housing body according to the present invention furnishes the basis for forming spindle units while the arrangement on the machine frame may be effected in different ways.

According to one embodiment of the present invention, the balloon confining bottom or the angled off portion on the front wall of the housing may be provided with a flange for connection with the machine frame. In conformity with the present invention, simultaneously provision may be made to move the spindle unit away from the machine frame, for instance in order by such movement to detach the whorl from the tangential belt. To this end, according to the present invention, the flange may be designed as a telescopically extensible slide. When moved inwardly, the spindle whorl will engage the driving belt but when moved outwardly, will disengage the same so that the spindle will stop. Instead of a connection by means of a flange to the balloon confining bottom or to the angled off portion of the front wall, the ceiling wall of the housing body may be provided with a flange for connection to the machine frame.

Instead of being fixed to or horizontally removable from the machine frame, the housing body may also be tiltably connected to the machine frame so that the whorl of a spindle can be detached from its driving belt by an outward tilting movement. This may be realized according to the present invention by designing that marginal area of the ceiling wall of the housing body which faces the machine frame as a joint for tiltable connection to the machine frame. In this instance, the housing body may together with its spindle be tilted upwardly and outwardly.

According to a further development of the invention, the housing body may be pivoted to the machine frame for upward tilting movement and may be detachably held in its working position by means of holding members connected to the housing body or the spindle receiving means. In this instance, in conformity with the present invention, a U-shaped or annular yoke may be provided for locating the housing body in its working position on the machine frame. Said yoke is engaged with radial play by the spindle bearing housing connected to the housing body. The spindle bearing housing rests on that side which is adjacent to the machine on a locking mechanism from which it is pivotable by the radial play so that the whorl will disengage the driving belt, and the spindle will come to a standstill. In the operative position, additionally the spindle bearing housing may be detachably held to said locking mechanism by a pawl as holding means. According to the invention, the spindle bearing housing may also be held in its operative position against the force of a spring so that the spindle bearing housing will following the detachment of the holding means automatically tilt outwardly from its operative position in view of the spring force so that the whorl will disengage itself from the driving belt. If desired, at the same time a spindle brake may become effective for stopping the spindle for a short period of time.

The tilting operation may be aided in conformity with the present invention by holding the spindle bearing housing with housing body outside the working position by means of a magnetic force.

In this way it will be made possible that simultaneously a brief braking and stopping of the spindle is effected and, more specifically, in such a way that above the spindle bearing housing a magnet is connected to the spindle which magnet faces a counter magnet mounted on a yoke. This counter magnet tilts the spindle into a predetermined position and holds the same therein. A mechanically effective spindle brake will therefore be superfluous.

As mentioned, the housing body creates the basis for producing spindle units which are independent of the spindle frame. In this connection, in conformity with a further development of the present invention, a magnet may be arranged on the front wall and/or at least one of the side walls of the housing body, and such a magnet has associated therewith a counter magnet provided on the stationary bobbin carrier. In distinction therefrom, with heretofore known two-for-one twisting machines, the magnet or magnets cooperating with the counter magnet or magnets are connected to the balloon confining member or are connected to the machine frame independently therefrom. The arrangement of the magnet in conformity with the present invention assures a more precise coordination of the magnets with each other than is obtained by housing one magnet on the balloon confining member or on the machine frame.

The magnet may be arranged at least in one of the corners between the front wall and the side wall of the housing body. These corners usually furnish the best place. In addition thereto the arrangement in the corners brings about a precise location, especially with regard to the spindle axis.

The housing body according to the present invention also makes it possible to simplify the passage of electric current into the spindle range, for instance to the electromagnets, or to feed wetting means avivage, or the like, to the thread or to the yarn body on the spindle.

According to the invention it may be provided that the housing body houses conduits for feeding avivage, wetting means, gas, or the like, or to receive electric conductors and connecting elements. These may be built into the housing body from the very start or may be molded thereinto while coupling means may be provided by means of which the connection of the feeding lines in the housing body with the respective conduits in the machine frame may be established. Coupling means may be employed which will not affect the detachment of the housing body from the machine frame and can easily be closed during the assembly.

In order to reduce the weight of the individual block-shaped housing bodies and to improve the accessibility of the individual spindles when they are individually removed or tilted outwardly, according to the present invention the vertical side walls of the block-shaped housing body may be recessed on the side facing the frame.

The covering of the spindle or the machine frame may be furthermore improved by providing the ceiling wall with an upwardly extending extension with spindle spacing in which that marginal portion which faces the frame is designed as pivotal joint. In this way the machine cover will be enlarged in upward direction while forming a single piece, and the lever arm will be extended when the housing body is tilted.

The upwardly extending extension of the ceiling wall has further advantages. Thus, the upwardly directed extension of the ceiling wall may be provided with a thread guiding member which is adjustable as to height which due to its connection to the housing body may be precisely aligned with the spindle axis and this may be effected already prior to the assembly of the entire machine. In contrast thereto, with heretofore known machines, such thread guiding members had to be adjusted individually after the mounting of the spindle.

The heretofore known machines of the type involved are partially equipped also with separators, as a rule with plates which separate the individual working ranges of the spindles from each other. These separators are with heretofore known machines as a rule connected to the machine frame. In distinction therefrom, the present invention provides that between the individual housing bodies there are connected separators while the housing bodies according to the invention may be employed for supporting the separators so that they will be fastened independently of the machine frame.

According to another embodiment of the invention it is also possible to provide each housing body on one side thereof with a separator so that when the individual housing bodies are arranged one alongside the other, a separator will be provided between each spindle.

The employment of housing bodies according to the present invention permits properly to cover the machine frame so that such a machine will give the impression of a compact vertical body and will also permit at least a partial covering of the tension rollers and driving belts. The housing body according to the invention furthermore furnishes the prerequisite for covering the machine inasmuch as that above and/or below the housing body there will be provided a machine cover adjacent thereto, the upper machine covering extending up to the vertical longitudinal plane of the machine, preferably upwardly in an inclined manner. This machine covering may also serve for covering the winding bobbins, delivery mechanisms and advancing rollers, but may also extend below the same and serve for connecting the same.

The balloon confining member may form a single piece with the balloon confining inner wall, for instance in the manner described in German Patent No. 1,150,011 in connection with housing bodies. However, it is also possible to design the balloon confining member in a manner known per se as a bent circulating foil strip which is detachably inserted into the housing body.

In this way, the balloon confining inner wall will be radially yieldable to a certain extent, and in case of occurring wear or soiling it can easily be exchanged. The exchanging operation will encounter no difficulties because, if need should be, the spindle unit associated with the housing body may as a unit be detached from the machine frame so that the exchange of the foil strip can be effected outside the machine frame. The inner cross section of the bent circulating foil strip may be circular or polygonal.

Figure 1:
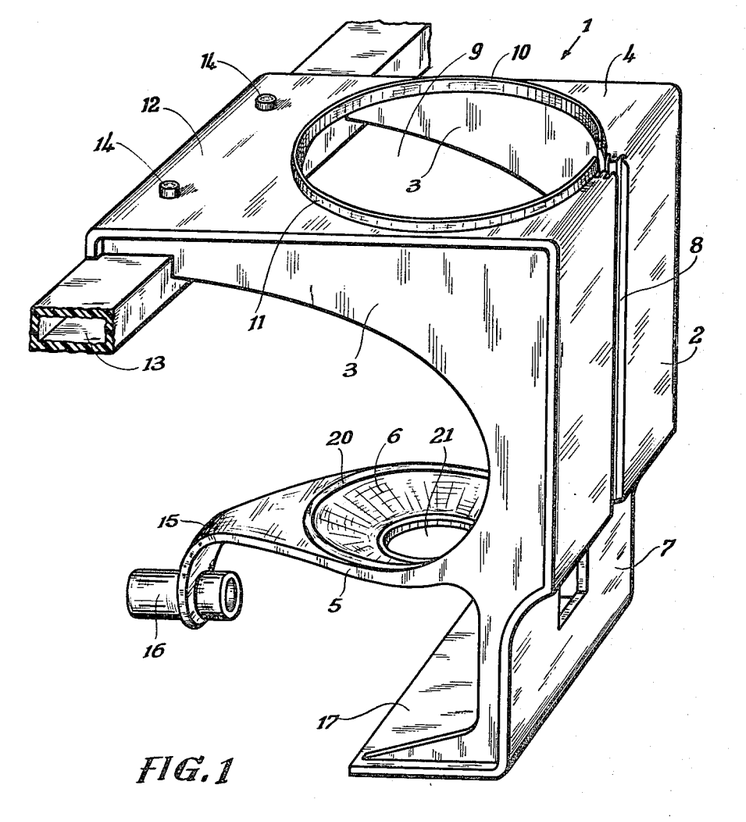
FIG. 1 is an isometric view of a block-shaped housing for receiving a two-for-one twisting spindle.

Referring now to the drawings in detail, the housing body 1 has a front wall 2 and side walls 3, a ceiling or top wall 4, and a housing bottom 5 which latter has a circular portion 6 forming the balloon confining bottom. Front wall 2 is provided with a downwardly extending extension 7 and is also provided with a threading slot 8. The top wall 4 is provided with a receiving opening 9 for the balloon confining means proper. An annular rib 10 extends around the opening 9 while outside said rib 10 there is provided an annular groove 11. As will be seen from FIG. 2, the upper rim portion of a cylindrically bent foil 19 of synthetic material or sheet metal may be folded about annular rib 10 and inserted into annular groove 11 so that cylindrically bent foil 19 will be firmly located in top wall 4. Instead of employing a cylindrical foil, also a foil of a polygonal cross section may be employed in which instance, of course, the opening 9 in top wall 4 will then be polygonally shaped. Simultaneously, the annular rib 10 and annular groove 11 will then be poygonal.

As will be seen from the drawings, housing body 1 is designed as a single piece body. However, it is, of course, also possible to build up housing body 1 of individual parts, i.e., individual wall sections which may be produced independently of each other and then composed to the housing body by welding or riveting.

According to the embodiment of FIG. 1, top wall 4 is extended toward the machine frame by means of a flange 12 which rests on a rail 13 of the machine frame and may be detachably connected thereto by means of screws 14.

The housing body 5 is provided with a support 15 intended for the runner or roller and equipped with a bearing eye 16 in which the support for the runner is to be mounted. The lower marginal portion of extension 7 of front wall 2 has an inwardly bent section 17. When the two-for-one twisting spindle has been inserted into the housing body 1, said angled off portion 17 is below those spindle parts which are provided below the housing bottom 5. In this way, the front wall 2 with extension 10 and angled off portion 17 will cover the spindle toward the front and toward the bottom and thus protect the same against dust and lint.

Figure 2:
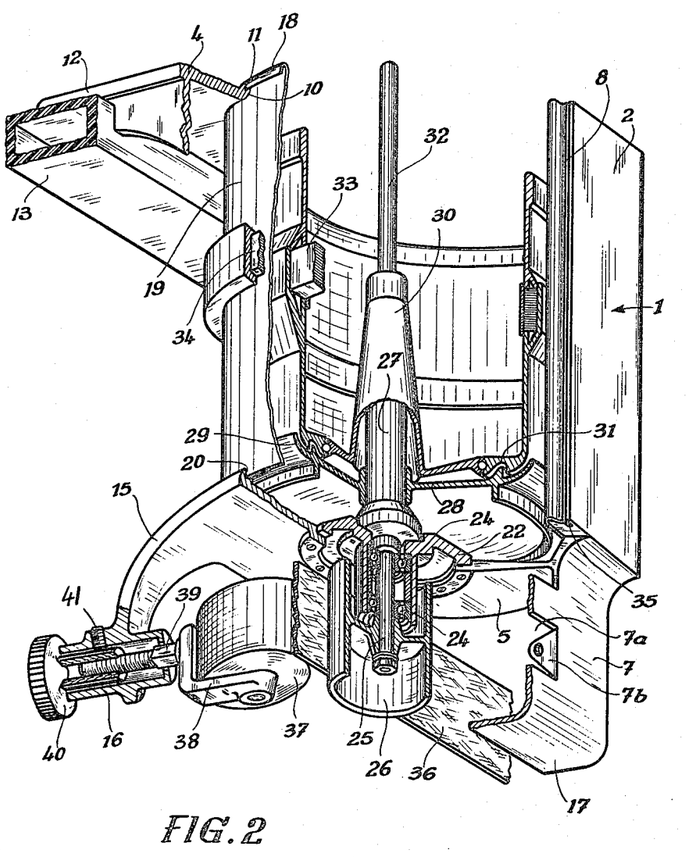
FIG. 2 illustrates partly in section the housing body according to FIG. 1 with a two-for-one twisting spindle arranged therein.

FIG. 2 shows the housing body 1 of FIG. 1 with inserted two-for-one twisting spindle and a tensioning roller partially in section. As will be seen from FIG. 2, the upper marginal portion 18 of the individual foil strip 19 is connected to the top wall 4. The lower marginal portion of the individual foil strip 19 engages an annular groove 20 in the housing bottom 5, said groove 20 extending around the balloon confining bottom section 6. It will thus be evident from FIG. 2 that the individual foil strip 19 may at its marginal portions be held by the top wall 4 as well as by the bottom wall 5.

The spindle rotor of the two-for-one twisting spindle is journalled in the bottom wall 5. To this end, the marginal portion of the opening 21 (FIG. 1) of the balloon confining bottom 6 has connected thereto the annular bearing flange 22 with the bearing bushing 23 formed thereon. By means of antifriction bearings 24 the rotor shank 25 is journalled in bearing bushing 23 while a whorl 26 is mounted on said shank 25. Rotor shank 25 is above the annular bearing flange 22 provided with an enlargement 27 on which is mounted a thread storage disc 28 with a circumferential deviating rim portion 29. Mounted on section 27 of rotor shank 25 and above the storage disc 28 there is stationarily arranged a bobbin carrier 30 which is connected to the protective basket 31. The hollow spindle shank 32 which forms the thread guiding tube protrudes upwardly beyond the bobbin carrier 30.

The protective basket 31 is at about its central area provided with magnets 33 carried by protective basket 31 and forming the counter magnets to magnets 34. Magnets 34 extend around the foil strip 19 and are connected to the inside of housing body 1 while being preferably arranged at the corners thereof. Magnets 34 in cooperation with the counter magnets 33 bring about that basket 31 and thus bobbin carrier 30 and the hollow spindle shank 32 will stand still and will not rotate with the spindle rotor.

As will be seen from FIG. 2, all spindle parts and their bearing parts are covered toward the outside by the housing body 1, in other words are encased. The vertically oppositely located edges of cylindrical foil strip 19 end at the threading slot 8 of housing body 1. These edges are angled off toward the outside and inserted in grooves 35 (FIG. 2), which grooves are arranged in housing body 1 at both sides of the threading slot 8. In this way the foil strip 19 is additionally supported by the housing body 1. Threading slot 8 in housing body 1 extends to the interior of cylindrical foil strip 19, namely of the thread confining member proper.

Whorl 26 arranged below bottom wall 5 is covered toward the front by the extension 7 of front wall 2 and is partially covered toward the bottom by the angled off section 17 so that whorl 26 is protected against dust and lint. In addition thereto, extension 7 protects the operator from accidentally contacting the rotating whorl 26 which latter is driven by a tangential belt 36 driven by the machine drive. Tangential belt 36 is held in proper frictional engagement with whorl 26 by means of tension rollers 37 which are arranged between the whorls of the spindles or adjacent the whorls 26. The tension rollers 37 are journalled in a support 38 which by means of a holding bar 39 (FIG. 2) engages the bearing eye 16 of the roller support 15. Holding bar 39 is non-rotatably but axially adjustably arranged in bearing eye 16. To this end, holding bar 39 is of a square cross section and has a threaded cylindrical end on which an adjusting nut 40 is screwed which in its turn is mounted in the bearing eye 16 and held stationary by means of a screw 41. By means of this adjusting device comprising adjusting nut 40 and screw 41, the respective required pressure to be exerted upon belt 36 may be obtained.

Extension 7 of front wall 2 has a cutout 7a for the mounting of a spindle brake. At both sides of cutout 7a there are provided bearing ears 7b (FIG. 2) for pivotal connection with the actuating levers of the spindle brake.

As will be evident from FIG. 2, housing body 1, the spindle parts arranged and journalled therein, and the tension roller 37 carried by housing body 1 form a structural unit which as a unit is detachably connected to rail 13 of the machine frame so that this unit can as an entirety be assembled outside the machine frame and then as a unit be connected to the machine frame. The possibility of individually assembling and mounting and dismounting such units to and from the machine frame not only greatly facilitates the assembly but also the repair and cleaning.

Figure 3:
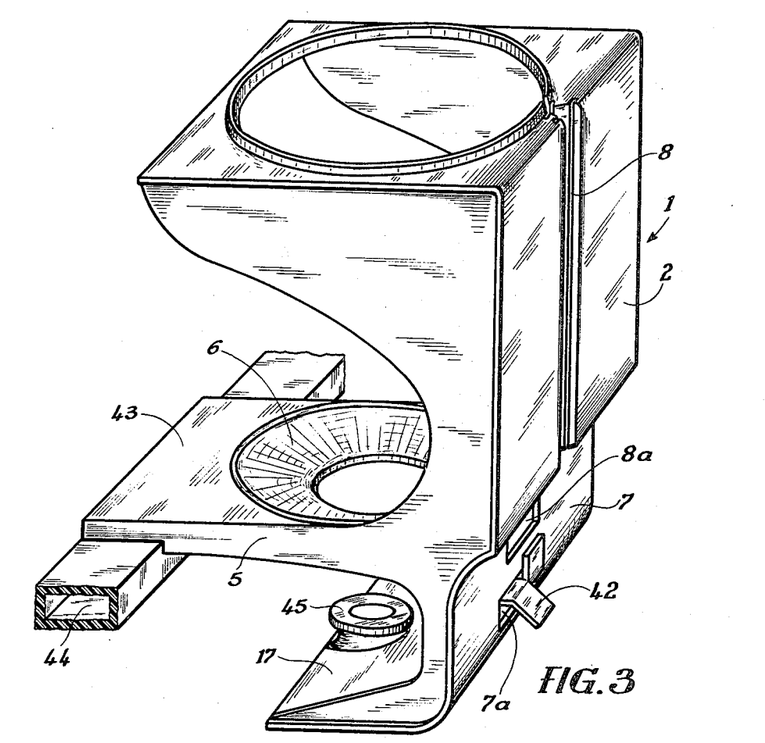
FIG. 3 is an isometric view of a housing body having its bottom wall connected to a machine frame.

While FIGS. 1 and 2 illustrate a housing body 1 and a two-for-one twisting spindle adapted to be connected to a machine frame by means of a flange 12 provided on the top wall 4, FIGS. 3 to 6 show other possibilities of connecting the housing body to a rail of the machine frame. Thus, according to FIG. 3, the bottom wall 5 of housing body 1 is provided with a flange 43 and is by means of this flange detachably connected to a rail 44 of the machine frame. Thus, flange 43 according to FIG. 3 replaces flange 12 of FIG. 1. FIG. 3 furthermore shows that the threading slot 8 within the range of bottom wall 5 is provided with a broadened portion 8a through which the interior of housing body 1 or the parts of the spindle within the range of the spindle rotor will be accessible. Similar to the arrangement of FIG. 2, the extension 7 of front wall 2 is designed for the mounting of a spindle brake which is operable by an actuatng lever 42.

The arrangement of FIG. 3 furthermore differs from that of FIGS. 1 and 2 in that the balloon confining bottom 6, in contrast to the arrangement of FIG. 2, does not serve for receiving the spindle bearing. Instead, the angled off portion 17 with the bearing eye 45 serves for the journalling of the spindle.

Figure 4:
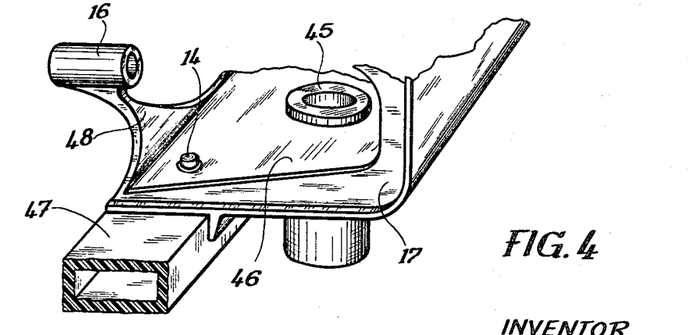
FIG. 4 is a slight modification over the lower portion of FIG. 3 inasmuch as the housing body is provided with an angled off section for connection with the machine frame.

According to FIG. 4, the angled off portion 17 is likewise provided with a spindle bearing eye 45. However, in contrast to FIG. 3 the angled off portion 17 is extended by a flange 46 and by means of the latter is detachably connected to a rail 47 of the machine frame, for instance by means of a screw 14. That edge portion of the angled off portion 17 which is adjacent to the frame is provided with a tension roller support 48 having a bearing eye 16 whereby it is possible to provide a tension roller arrangement similar to that of FIG. 2.

Figure 5:
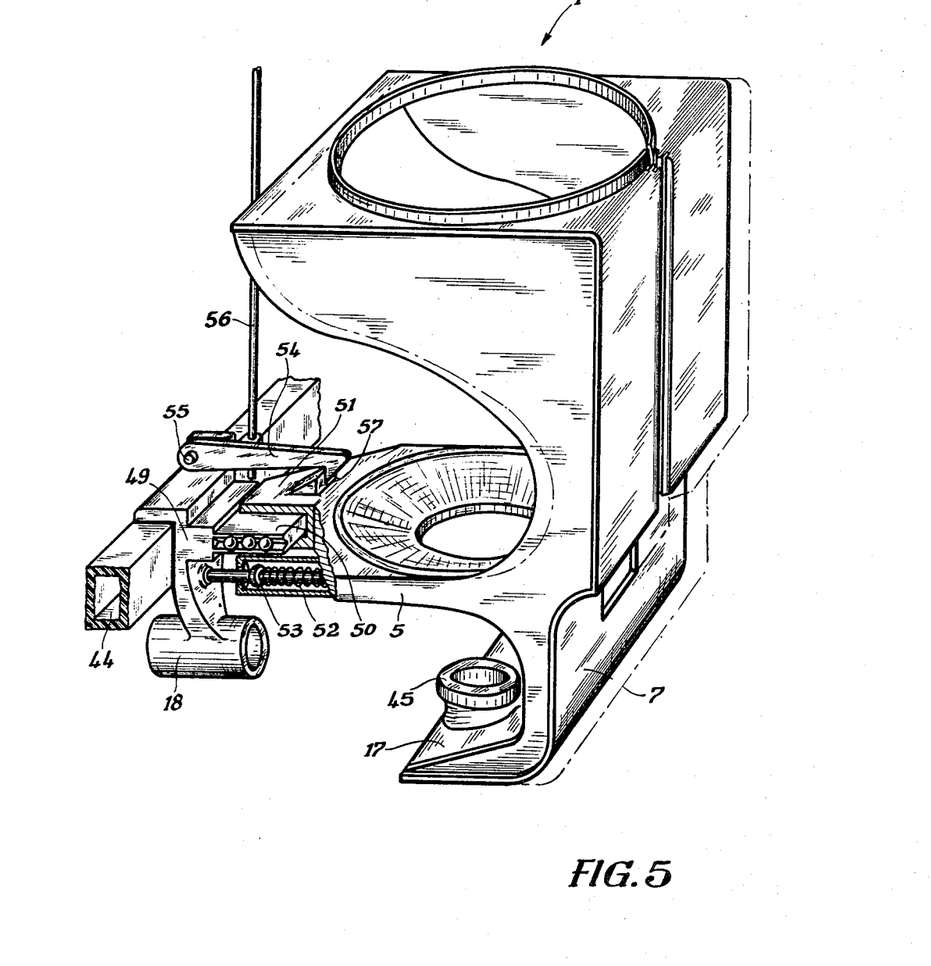
FIG. 5 represents an isometric view of a housing body having a flange designed as a slide for connection by its bottom wall to a machine frame.

The structure of housing body 1 shown in FIG. 5 corresponds substantially to that of FIG. 3 but differs therefrom in that flange 43 of FIG. 3 which is connected to the bottom wall 5 has been replaced by a telescopic slide by means of which the housing body 1 together with the two-for-one twisting spindle may be moved horizontally away from rail 44 of the machine frame as a result of which whorl 26 will be spaced from the tangential belt 36 which normally is pressed against the whorl by means of a tension roller 37 held in the bearing eye 16 connected to a slide part 49. Slide part 49 is connected to rail 44 and carries locking means 50 straddled at the top and at the bottom by bottom wall 5 and its flange 51. FIG. 5 shows flange 51 and locking means 50 of slide part 49 moved together against the thrust of spring 52 which rests against a bolt 53. In this position, flange 51 is, by means of a pawl 54, secured against movement by the thrust of spring 52 toward the outside. Pawl 54 is pivotally connected at 55 to the slide part 49. Pawl 54 is adapted to be lifted by means of a bar 56 so that it will move its hook 57 out of engagement with flange 51. When this occurs, spring 52 moves housing body 1 on locking means 50 toward the outside and thus spaces the whorl from the tangential belt. This moved-out position of housing body 1 is illustrated in FIG. 5 in dot-dash lines.

Figure 6:
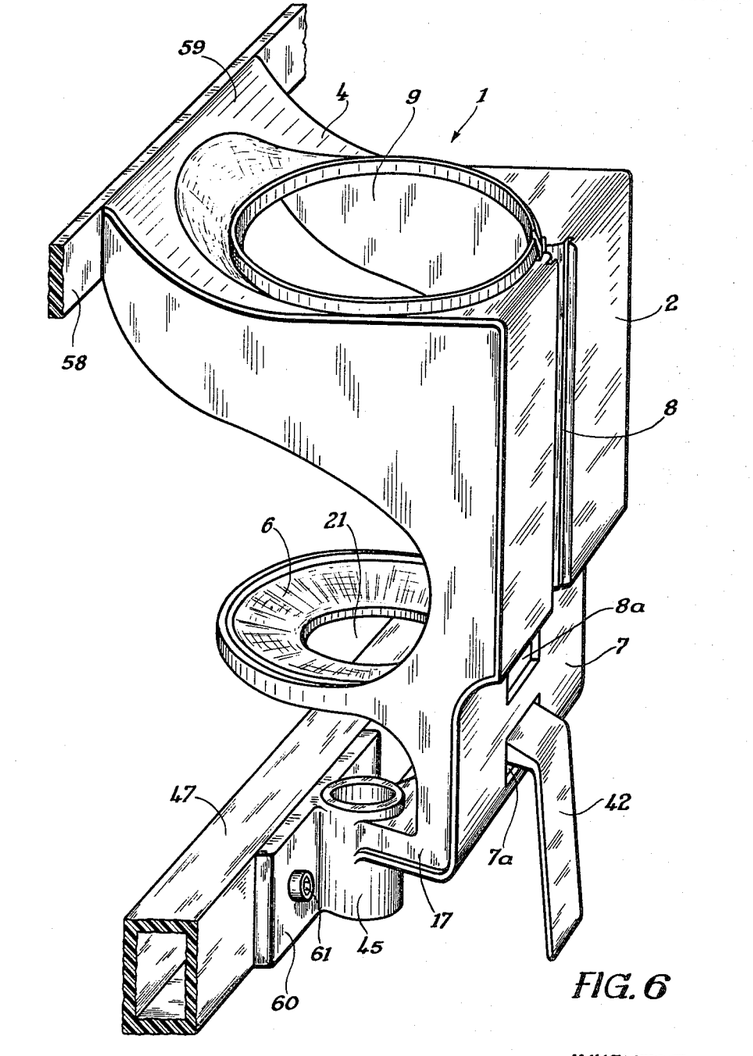
FIG. 6 represents a further embodiment of a housing body which is connected to the machine frame by means of the supporting means for the spindle.

FIG. 6 illustrates a housing body 1 which is connected to the machine frame at two areas. Thus, the housing body 1 is connected to the machine frame once by rail 58 engaged by housing body 1 by means of the marginal portion 59 of the top wall 4. Top wall 4 has that portion thereof which faces the machine frame curved upwardly to thereby form the connecting surface for connection with rail 58.

Housing body 1 is furthermore by means of flange 60 on bearing eye 45 of angled off portion 17 detachably connected by means of screws 61 to rail 47 of the machine frame; otherwise the structure of housing body 1 as shown in FIG. 6 corresponds to that of FIGS. 3 and 4 with the exception of the way in which it is connected to the machine frame and with the exception of the design of the actuating lever 42 for the spindle brake.

Figure 7:
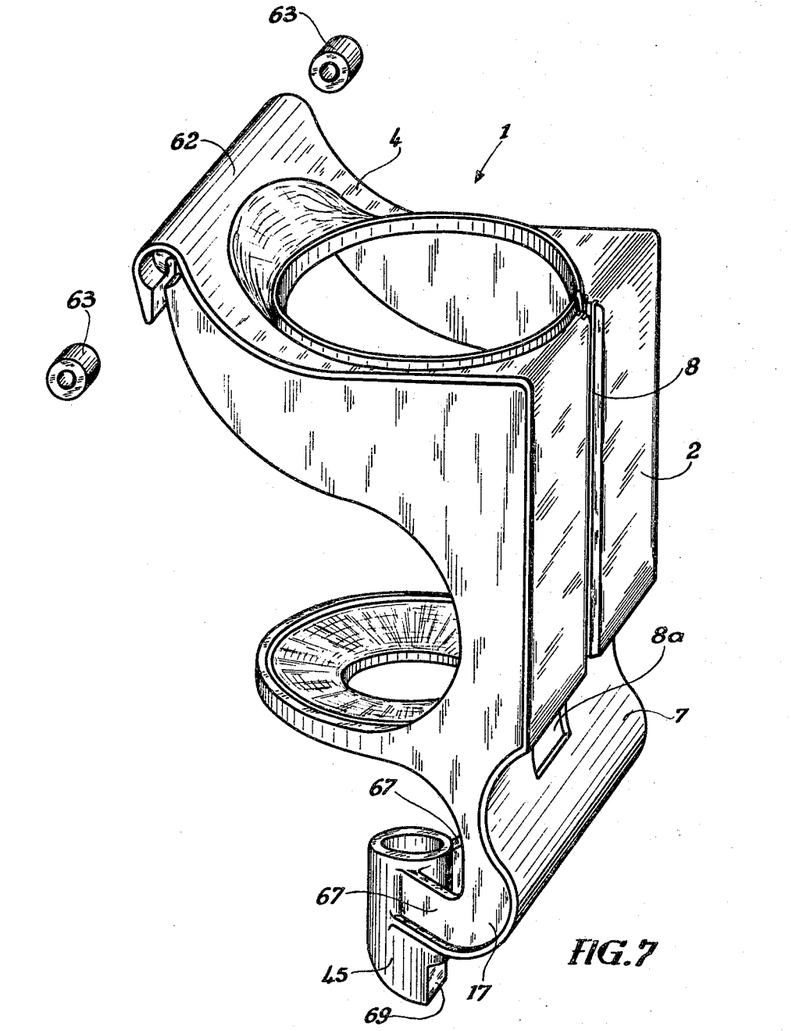
FIG. 7 is an isometric view of a housing body which is tiltably connected to the machine frame.
Figure 8:
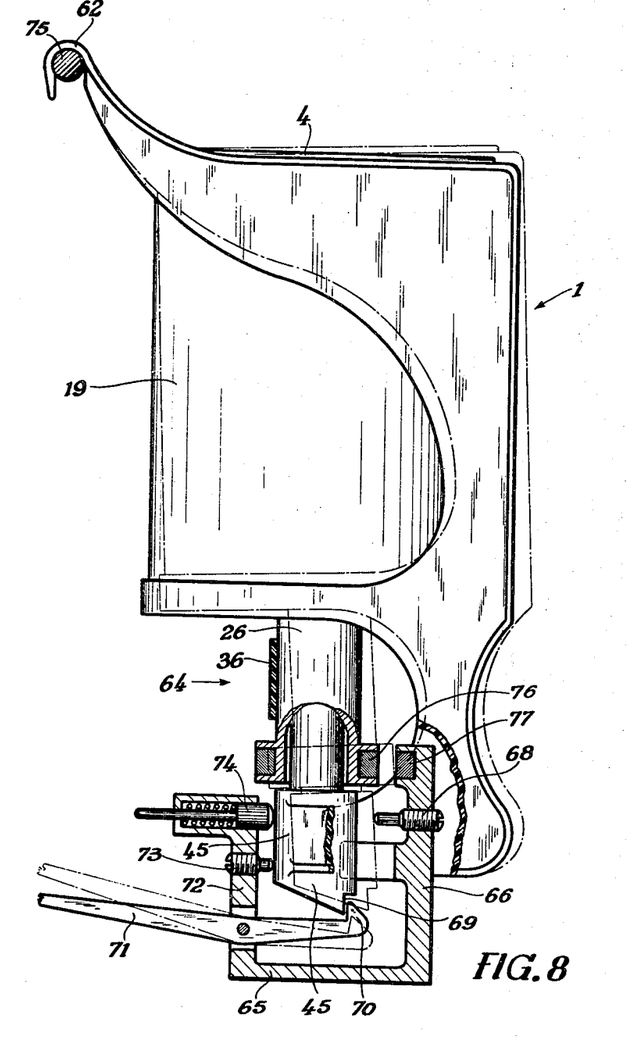
FIG. 8 shows a housing body according to FIG. 7 in side view and partially in section with a two-for-one spindle arranged therein.

The embodiment of FIG. 7 resembles that of FIG. 6 but differs therefrom in that the bearing eye 45 is not connected to the machine frame. Instead, housing body 1 is provided with a coiled portion 62 provided on top wall 4. The said coiled marginal portion of top wall 4 forms a longitudinally slotted hinge sleeve adapted to engage a bar in the form of a hinge and protects it against accidental detachment by cylindrical bodies 63 to be placed on such hinge bar. This type of connection of housing body 1 with the machine frame permits an upward tilting or lifting of housing body 1 with the two-for-one twisting spindle carried thereby to thereby detach the whorl from the tangential drive belt and to stop the spindle. A detailed bearing arrangemnt for the spindle in housing body 1 according to FIG. 7 is shown in FIG. 8. FIG. 8 shows the housing body 1 in side view and in section with the spindle parts. More specifically, the spindle rotor generally designated 64 is journalled in the bearing eye 45. Above the spindle bearing eye 45 there is provided the whorl 26 engaged by the tangential belt 36. A U-shaped yoke 65 partially extends below the bearing eye 45, while yoke 65 by means of its legs 66 extends between the legs 67 of the angled off portion 17 of FIG. 7. Leg 66 is provided with an abutment screw 68 extending toward the bearing eye 45. On that side which faces yoke 66, bearing eye 45 is provided with a pawl surface 69 adapted to be engaged by pawl 70 of the pawl lever 71, pawl 70 being tiltably arranged on yoke 65. Leg 72 of yoke 65 carries an abutment screw 73 and also a spring loaded piston 74. In this way the bearing eye 45 is fixed in one direction by pawl lever 71 and in the opposite direction by the abutment screw 73 while additionally the spring loaded piston 74 acts upon eye 45.

When pawl 70 is detached from the locking surface 69 by tilting lever arm 71, the spring urged piston 74 permits the bearing eye 45, which forms one piece with housing body 1, to tilt toward leg 66 of yoke 65. Inasmuch as bearing eye 45 forms a part of the housing body 1, it will be evident that therefore also the entire housing body 1 will move about hinge bar 75 toward the outside into the dot-dash line position. In view of this tilting movement, whorl 26 detaches itself from the tangential belt 36 so that whorl 26 will then be without a drive. The braking of whorl 26 after it has detached itself from belt 36, and thus the braking of the spindle rotor, is effected by the annular magnet 76 associated with or adapted to cooperate with magnet 77 on leg 66. Annular magnet 76 is carried by the spindle rotor below whorl 26. It will thus be seen that magnet 77 aids the tilting off of housing body 1 and in addition thereto by bringing magnets 76 and 77 closer to each other will bring about that whorl 26 and thus the spindle rotor will be stopped in a short period of time. By a corresponding association of the magnets with each other, there is obtained the possibility to determine the end position of the spindle rotor during the standstill of the latter. To this end, the magnets may be so arranged that when the spindle rotor is stopped, the thread exit passage in the spindle rotor will be directly outwardly and will be in alignment with the broadened portion 8a of the threading slot 8 so that in this position the threading of the thread can easily be effected from the outside. When housing body 1 is again tilted toward the machine frame and pawl 70 again engages the locking surface 69, hosuing body 1 will again be in position of operation. Whorl 26 will then again engage driving belt 36 so that the spindle rotor will again be rotated.

Figure 9:
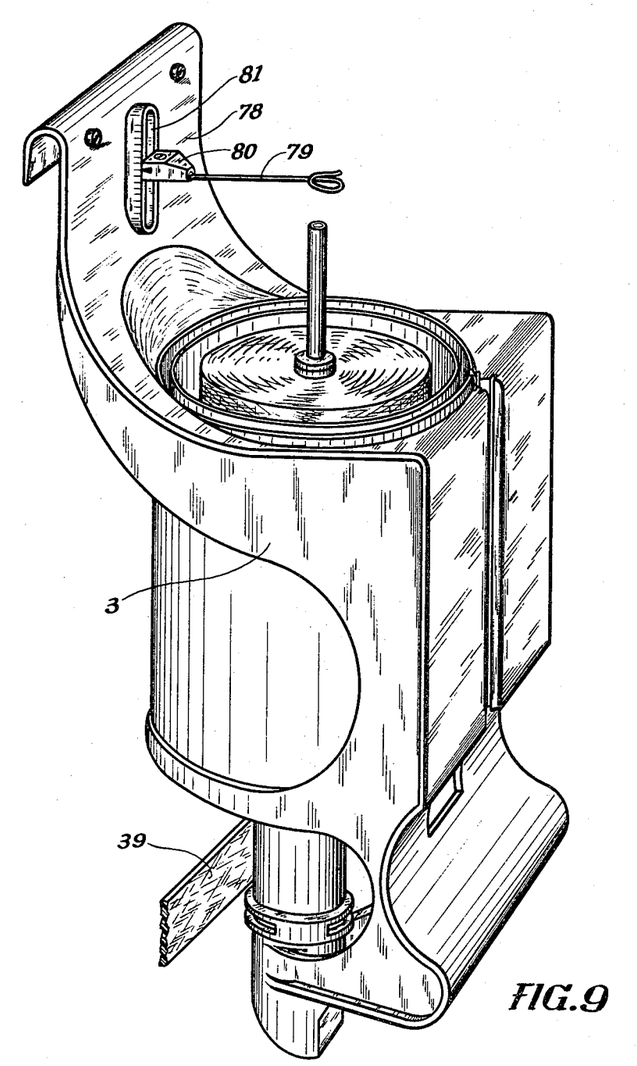
FIG. 9 shows the housing body of FIGS. 7 and 8 with a two-for-one twisting spindle, in which the ceiling wall and the thread guiding member adjustable as to height is somewhat modified over the arrangement of the preceding figures.

FIG. 9 illustrates a two-for-one twisting spindle, housing body 1 of which substantially corresponds to the housing body 1 according to FIG. 7 but with the difference that that marginal portion of top wall 4 which is adjacent the machine frame is provided with an upwardly directed extension 78 in which the thread guiding member 79 in the form of a pigtail is adjustable as to height. Thread guiding member 79 is held by a slide 80 which is movable upwardly and downwardly in a slot 81. Otherwise the embodiment of FIG. 9 substantially corresponds to that of FIGS. 7 and 8.

In all illustrated embodiments described above, those side walls 3 which are adjacent to the frame have an arched cutout in order to save material and to facilitate access to the interior of the housing. When individual housing bodies 1 are arranged adjacent to each other and connected to the machine frame, the housing bodies will cover the spindles over the length of the machine while still permitting the removal of the individual spindle units independently of other spindle units. This is clearly illustrated in FIG. 10 which represents a section of a machine frame with housing bodies arranged thereon, said housing bodies being designed in conformity with the embodiment of FIG. 9. In addition thereto, between the individual housing bodies 1 there are arranged separators 82 which may form separate parts connected as separate parts to one of the housing bodies or they may be connected to one of the housing bodies 1 only so that when these housing bodies are assembled, they will have the appearance as shown in FIG. 10.

Above housing body 1 there may be provided an additional cover 83 which extends upwardly at an incline toward the central plane of the machine so that said cover 83 will cover the entire interior of the machine frame up to the center thereof. When machines are involved with spindles on opposite sides, the other side will, of course, be arranged correspondingly so that a complete cover of the machine frame will be obtained from both sides.

Figure 11:
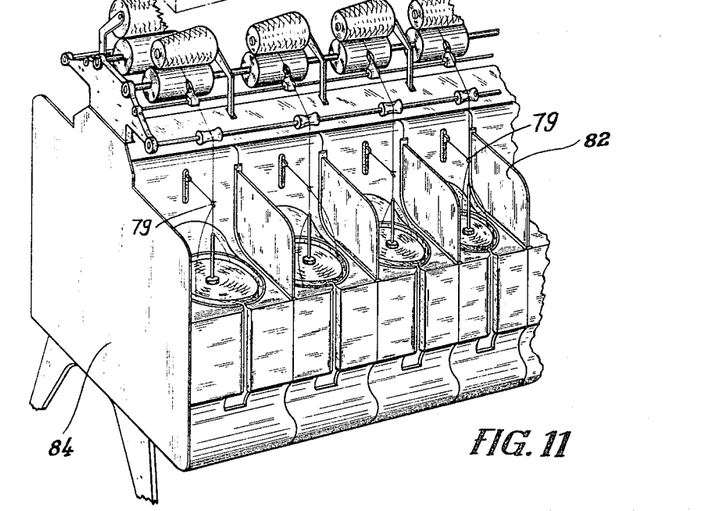
FIG. 11 is an isometric view of a cutout of a two-for-one twisting machine with an additional frame cover which is arranged above the housing bodies located side by side.

Above cover 83 there may be provided the advancing or leading rollers, thread guiding members and the driving rollers with the winding bobbins. Such an arrangement is shown in FIG. 11. The thread guiding members 79 illustrated in FIG. 11 in the form of pigtails may be adjusted together as to height by means of a centrically controlled adjusting device common to all of said thread guiding members. It is also possible to arrange the just mentioned parts below the cover 83 which would then be provided with flaps in order to permit access to the yarn winding bobbins. Furthermore, there are provided cutouts in order to guide the thread coming from the two-for-one twisting spindle to the yarn bobbins. According to FIG. 11, between the individual housing bodies 1 there are provided separators 82 the last separator being formed by the end field 84 of the machine frame.

Figure 10:
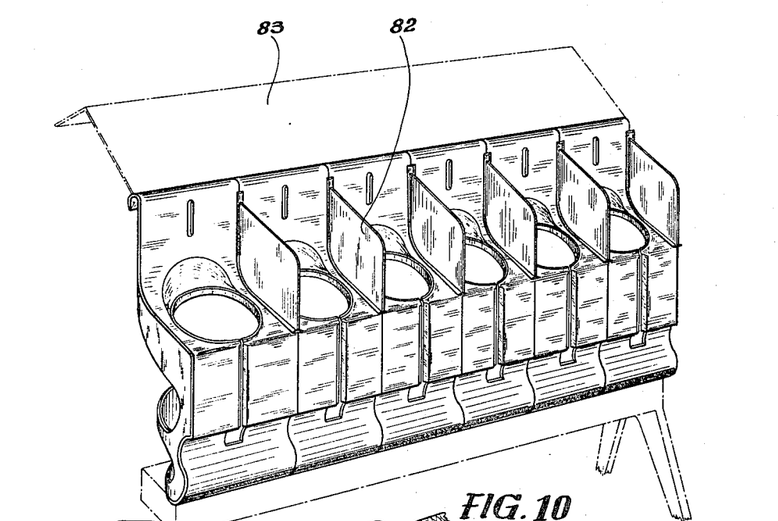
FIG. 10 is an isometric view of a plurality of housing bodies of FIG. 9 arranged side by side and provided with separators.

FIG. 11 in combination with FIG. 10 brings about that by employing housing bodies 1 according to the present invention, a machine can be built up which will form a compact unit.

The machine comprises primarily a machine frame which is subdivided into field sections with end fields for receiving the transmission and motor drive. Firmly or tiltably connected to the machine frame are individual spindle units which can be installed and removed as closed units. They form a complete cover for the machine frame portions adjacent thereto and can be supplemented by further covers in order to close toward the outside the entire inner space of the machine frame with the driving elements therein. In this connection there exists the possibility as shown in the drawings that also the tension rollers for the belts can be combined with the spindel units and can be arranged in such a way that they form a part of the spindle unit. The actuating levers or the like for the spindle brakes may be linked to the housing bodies 1 so that the spindle brakes can likewise form a part of the spindle unit.

If it is intended to connect the elements arranged within the housing body 1, such as magnests, to electric conductors or to feed to the thread or the yarn bobbin in the interior of the houseing body 1 processing means, such as avivage, wetting agents, or the like, feeding conduits therefor may be provided within the housing body directly therein, and the connection with the machine frame may be disengaged when the housing body is disengaged from the machine frame and will be connected when the housing body 1 is connected to the machine frame.

As will be seen from the above, by employing a housing body according to the present invention and arranging a balloon confining means and the holding means with the spindle bearing therein as described above, a building unit will be obtained which with modern manufacturing techniques will assure that the wall surface of the balloon confining means will be located precisely coaxially with regard to the spindle axis without requiring any further adjustment.

In view of the present invention, a spindle rail in the meaning heretofore common will become superfluous inasmuch as the housing body will take its place without being designed as a single piece so that individual housing bodies including the spindle and balloon confining means can be detached from the machine in order to effect replacement or cleaning work outside the machine frame. The operation of the adjacent spindles will thus not be affected by the operations on one spindle. Each spindle together with the housing body therefor can according to the present invention be assembled as a unit completely independently of the machine frame and the other units and an exchange of the units may be effected accordingly.

The houseing body according to the present invention furthermore has the advantage that together with adjacent housing bodies it forms a partial machine cover so that the deposit of lint and dust within the range of the spindles on the movable parts thereof and those parts which come into contact with the thread will be reduced to a minimum. A further advantage consists in that the individual parts of the spindles including the balloon confining means can be assembled outside the machine frame and prepared for insertion into the machine. The desired location of the parts relative to each other will be assured by a corresponding machining of the housing bodies.

It is, of course to be understood that the present invention is, by no means, limited to the particular arrangements and constructions shown in the drawings but also comprises any modifications within the scope of the appended claims.

What I claim is:

1. A two-for-one twisting machine which includes: a machine frame, a plurality of housing means arranged directly adjacent to each other in the longitudinal direction of the machine, each of said housing means being individually detachably connected to said machine frame and having the same width measured in the longitudinal direction of the machine, a plurality of spindles respectively rotatably journalled in said housing means and spaced from each other by a distance substantially equalling the width of said housing means, whorl means respectively associated with said spindles for driving the same, a plurality of balloon-confining means respectively arranged in said housing means around said spindles, said housing means normally covering said spindles and said balloon-confining means at least toward that side from which the machine is to be operated while at said last-mentioned side forming a cover extending over substantially the length of said machine, each of said housing means carrying bearing means for the respective spindle therein and being pivotally connected to said machine frame for tilting relative thereto into an ineffective position, said machine frame comprising a yoke section adapted to receive said bearing means with radial play, arresting means supported by said yoke section and operable to hold said bearing means in working position, said arresting means being disengageable from said bearing means to permit tilting of said housing means and thereby of said bearing means by an angle corresponding to the play from its working position to its ineffective position, and magnetic means associated with said whorl means for holding said housing means together with the respective spindle therein in its ineffective position.

2. A machine according to claim 1, in which each of the spindles above the spindle bearing means has connected thereto a magnet, and in which said yoke section has a counter magnet located opposite to said first mentioned magnet and operable to hold the spindle in non-working position.

3. A textile machine unit for use in connection with a two-for-one twisting machine, which includes: a block-shaped housing having a top wall and a bottom wall with a balloon confining wall section, and a front wall with a threading slot, one of said walls being provided with means for detachably connecting said housing to a two-for-one twisting machine frame, and a spindle bearing casing arranged substantially coaxially with regard to said balloon-confining wall section and in fixed connection therewith.

4. A textile machine unit according to claim 3, which includes casing means substantially coaxial with and supported by the balloon-confining bottom wall section, bearing means arranged within said casing means, a spindle rotatably supported by said bearing means and having a portion extending through and below said balloon-confining bottom wall section, the front wall of said housing having a downwardly directed extension angled off in the direction toward the axis of said spindle and arranged at a level below the spindle portion extending through and below said balloon-confining bottom wall section.

5. A textile machine unit according to claim 4, which includes spindle brake means, and actuating means accessible from the outside of said front wall and operatively connected to said spindle brake means for actuating the same.

6. A textile machine unit according to claim 4, in which said angled-off extension is provided with supporting means for receiving and supporting a portion of said spindle.

7. A textile machine unit according to claim 4, in which said bottom wall has connected thereto supporting means, and tension roller means displaceably supported by said supporting means.

8. A textile machine unit according to claim 4, in which the angled-off extension is provided with supporting means and tension roller means displaceably supported by said supporting means.

9. A textile machine unit according to claim 3, in which said bottom wall is provided with flange means for detachable connection to a machine frame of a two-for-one twisting machine.

10. A textile machine unit according to claim 4, in which the angled-off extension is provided with flange means for detachable connection with a machine frame of a two-for-one twisting machine.

11. A textile machine unit according to claim 3, which includes a spindle extending through said balloon-confining wall section and provided with whorl means arranged below said bottom wall section for rotating said spindle, said bottom wall being provided with telescopically extendable supporting means, and tension roller means supported by said supporting means and movable toward and away from said whorl means.

12. A textile machine unit for use in connection with a two-for-one twisting machine, which includes: a block-shaped housing having a top wall, a bottom wall with a balloon-confining wall section, a front wall with a threading slot, and side walls; one of said walls being provided with means for detachably connecting said housing to a two-for-one twisting machine frame, a spindle extending through said balloon-confining wall section and rotatably supported by said housing; bobbin carrier means surrounding said spindle and provided with first magnet means; and second magnet means supported by at least one of said walls and arranged for cooperation with said first magnet means.

13. A machine according to claim 12, in which said block-shaped housing has its top wall provided with an upwardly directed extension forming a part of a pivotal joint and representing the means for detachably connecting said housing to a two-for-one twisting machine frame, said extension having a width corresponding to the spacing of said two-for-one twisting spindles in the machine.

14. A textile machine unit according to claim 12, in which said second magnet means is arranged at least in one corner between the front wall and the side walls.

15. A textile machine unit according to claim 3, which includes conduit means supported by said housing and connectable to sources for supplying yarn-treating substances and energy conductors.

16. A textile machine unit for use in a two-for-one twisting machine, which includes: a block-shaped housing having a top wall, a bottom wall with a balloon-confining wall section, and a front wall with a thread slot; said top wall having an upwardly directed extension; thread guiding means adjustable as to height on and supported by said extension; and means connected to one of said walls for detachably connecting said housing to a two-for-one twisting machine frame.

17. A textile machine unit for use in a two-for-one twisting machine, which includes: a block-shaped housing having a top wall, a bottom wall with a balloon-confining wall section, a front wall with a threading slot, and side walls; one of said walls being provided with means for detachably connecting said housing to a two-for-one twisting machine frame; and wall means extending upwardly from at least one of said side walls and forming a separator.

18. A textile machine unit for use in a two-for-one twisting machine, which includes: a block-shaped housing having a top wall with an upwardly directed extension; a bottom wall with a balloon-confining wall section; and a front wall with a threading slot; one of said walls being provided with means for detachably connecting said housing to a two-for-one twisting machine frame; cover plate means detachably connected to the upper end of said extension and extending away from said housing for covering a portion of a textile machine unit located behind said housing; and means connected to said housing for detachably connecting the same to a two-for-one twisting machine frame.

19. A textile machine unit according to claim 3, which includes cover means arranged below and detachably connected to said housing for covering a portion of a textile machine.

20. A textile machine unit according to claim 3, which includes balloon-confining means formed by a tubularly bent foil strip detachably supported by said housing and coaxially arranged with regard to said balloon-confining bottom wall section.

References Cited
UNITED STATES PATENTS

| | | | |
|---|---|---|---|
| 2,453,353 | 11/1948 | Whitehead | 57—108 |
| 3,177,643 | 4/1965 | Halleux et al. | 57—85.76 |
| 3,299,624 | 1/1967 | Nimtz | 57—108 |

FOREIGN PATENTS

| | | |
|---|---|---|
| 592,099 | 9/1947 | Great Britain. |
| 976,643 | 12/1964 | Great Britain. |
| 1,306,955 | 9/1962 | France. |

FRANK J. COHEN, *Primary Examiner.*

WERNER H. SCHROEDER, *Assistant Examiner.*